Patented Aug. 2, 1927.

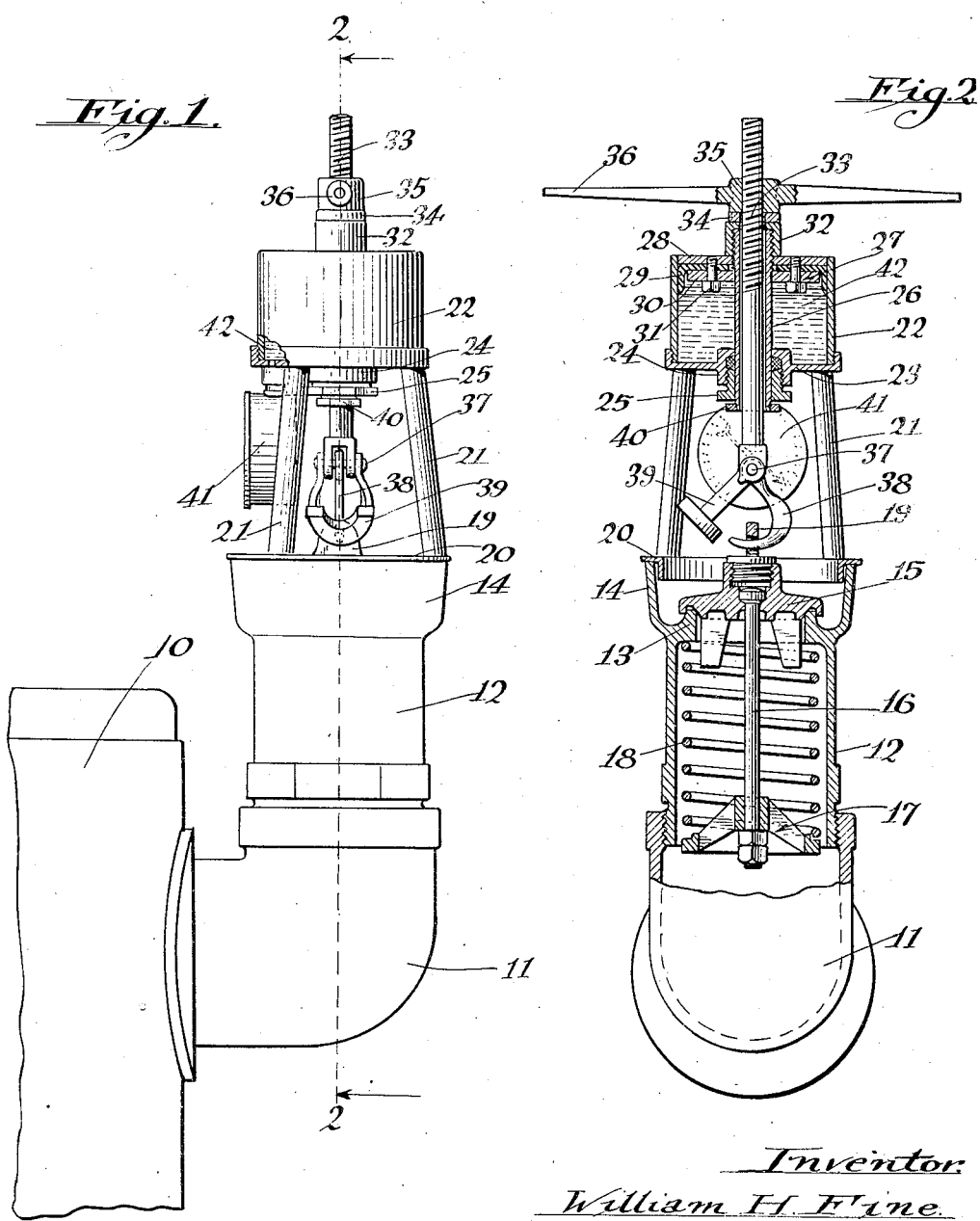

1,637,743

UNITED STATES PATENT OFFICE.

WILLIAM H. FINE, OF LOS ANGELES, CALIFORNIA.

DEVICE FOR TESTING SAFETY VALVES ON TANK CARS.

Application filed May 10, 1926. Serial No. 108,033.

This invention relates to a device for testing safety valves, such as are commonly employed upon tank cars used on railroads.

On the conventional tank car there is a safety valve which is urged into its seating position by means of a spring. These safety valves are required to be tested at certain intervals, and an object of this invention is to provide a readily portable device which can be easily applied to the safety valve and which will easily and quickly test it to ascertain whether or not the safety valve will open at the required pressure within the tank car.

Another object of this invention is to provide a device for testing safety valves which is quickly operable and at the same time is very accurate in determining the exact pressure at which the safety valve will open.

With the foregoing and other objects in view which will be made manifest in the following detailed description and specifically pointed out in the appended claims, reference is had to the accompanying drawings for an illustrative embodiment of the invention, wherein:

Figure 1 is a side elevation illustrating the safety valve on a tank car with the device constituting the invention shown in applied position thereon, and Fig. 2 is a vertical section taken on the line 2—2 of Fig. 1.

Referring to the accompanying drawings wherein similar reference characters designate similar parts throughout, the reference character 10 indicates the dome on the tank car which has an elbow 11 on which there is a nipple 12. The nipple 12 provides the valve seat 13 about which and above which there is an annular rim 14. The valve is indicated at 15 and has a stem 16 carrying a spider 17 providing a spring seat for a coil spring 18, the upper end of which is seated on the under side of the valve seat 13. Many of the safety valves now employed have their stems 16 provided with eyes 19 on their upper ends, while some safety valves have small knobs or buttons, permitting the valve to be grasped and lifted from its seat.

The invention consists of a base 20 preferably formed of a ring of angle iron. This base is adapted to fit upon the rim 14 on the nipple 12. On the base there are a plurality of supporting legs 21 which serve to support a cylinder 22 having a bottom 23. In the bottom 23 there is provided a stuffing box 24 into which a packing nut 25 is adapted to screw to tighten packing about a tube 26, which extends through the bottom and through the cylinder and through a plunger 27 therein. The plunger 27 may be of any desired construction and is illustrated as consisting of an upper plate 28 threaded onto the upper end of the tube 26. A cup leather 29 is positioned on its under side and is maintained in place by a plate 30 fastened as by bolts 31. A pipe cap 32 is threaded onto the upper end of the tube 26 and has an aperture formed therein to receive a jack screw 33 which extends through the tube 26. On top of the pipe cap there is a washer 34, or an antifriction bearing may be substituted therefor. A collar 35 is threaded onto the upper end of the jack screw and is provided with handles 36 to facilitate its being rotated. The lower end of the jack screw 33 is bifurcated and is provided with a rivet 37 on which are pivoted a hook 38 and a semi-circular yoke 39. A small ring 40 is threaded onto the lower end of the tube 26 and is engageable upon the packing nut 25 to prevent the tube 26 from being withdrawn or sliding out of the stuffing box in the event that the device is turned upside down while being transported from place to place. A pressure gauge 41 is mounted on the device and is in communication with the interior of the cylinder, and the interior of the cylinder is filled with a liquid 42, such as oil.

The operation of the valve tester is as follows: When the base 21 is applied to the rim 14 on the valve, the hook 38 is caused to enter the eye 19, if the valve happens to be provided with an eye. If the valve is provided with a button instead, the yoke 39 is caused to engage the button, so that either the yoke 39 or the hook 38 can be used to connect the jack screw 33. The collar 35 is then rotated by means of the handle 36, causing a tension to be exerted upon the jack screw 33 and causing the piston 27 to exert a pressure on the liquid 42. While the collar 35 is being rotated, the operator continually watches the pressure gauge 41. As liquids, such as oil, are practically incompressible, the piston 27 will move downwardly within the cylinder only a very small distance, so that in a comparatively few rotations of the collar 35, a sufficient tension will be exerted upon the jack screw 33 to lift the valve 15 from its seat. While the collar 35 is being rotated, the pointer on the pressure gauge 41 will move to indicate a corresponding increase in pressure. The pressure will increase steadily during the rotation of the collar 35 until the valve 15 leaves its seat. At the instant the valve leaves its seat, the pressure gauge will hesitate or discontinue the increase in pressure. during a continued rotation of the collar 35, and in this manner by watching the pressure gauge the operator can ascertain exactly at what instant the valve leaves its seat. At this time the entire force of the spring 18 and the friction of the parts has been overcome and a slight continual operation of the jack screw will not increase the pressure upon the liquid 42. As valves used on tank cars are practically all of the same size, the piston 27 can be made to present an area which is exactly equal to the area of the valve which is exposed to the pressure on the interior of the tank car. Accordingly, the operator as he tightens down the collar 35 watches the increase in pressure as indicated by the pressure gauge. When this pressure gauge hesitates to indicate an increase in pressure during rotation of the collar 35, the operator takes notice of that pressure which is indicated, and he will then know the exact pressure which will be necessary within the tank car to unseat the valve.

A double check is readily made by the improved device. After the collar 35 has been tightened down sufficiently far to remove the valve 15 from its seat, the operator can reversely rotate the collar 35 and watch the pointer on the pressure gauge. At first a reverse rotation of the collar will cause no perceptible decrease in pressure to be indicated. This is because the valve 15 has not yet engaged its seat. When the valve does engage its seat, the pressure gauge immediately begins to indicate a decrease in pressure as the collar 35 is being screwed up or reversely rotated upon the jack screw 33, and by watching the point at which this steady decrease in pressure begins, a double check is obtained in ascertaining the exact pressure necessary to remove the valve 15 from its seat.

It will be readily appreciated from the drawing that the tester is of compact form and can be readily transported from tank car to tank car to test the safety valves thereon. Furthermore, by using a hydraulic means for indicating the pressure as distinguished from a spring, the rotations of the collar 35 need only be a few in number to remove the valve 15 from its seat, thus enabling the test to be made very quickly. As conventional pressure gauges do not often get out of order, it is not necessary to calibrate or test the gauge 41, except at comparatively long intervals, which is advantageous over the use of a spring, in that springs usually need to be re-calibrated very frequently. If the pressure gauge 41 should for any reason be thought to be inaccurate, it can be very easily and quickly removed from the device and tested.

It will be understood that various changes in the detail of construction may be made without departing from the spirit or scope of the invention as defined by the appended claims.

I claim:

1. A safety valve tester comprising a support, a cylinder upon said support, a liquid in said cylinder, a plunger in the cylinder, a jack screw extending through the plunger, means for connecting the jack screw to a valve to be tested, a collar threaded onto the jack screw adapted on rotation to press upon the plunger to cause the jack screw to unseat the valve and at the same time to cause the plunger to exert pressure upon the liquid, and means for indicating the pressure developed upon the liquid in the cylinder.

2. A safety valve tester comprising a support, a cylinder upon said support, a liquid in said cylinder, a plunger in the cylinder, a jack screw extending through the plunger, means for connecting the jack screw to a valve to be tested, a collar threaded onto the jack screw adapted on rotation to press upon the plunger to cause the jack screw to unseat the valve and at the same time to cause the plunger to exert pressure upon the liquid, and means for indicating the pressure developed upon the liquid in the cylinder, said plunger presenting an area corresponding to the area of the valve.

3. A safety valve tester comprising a support, a cylinder upon said support, a liquid in the cylinder, a plunger construction in the cylinder upon the liquid, a tube secured to the plunger and slidably extending through the bottom of the cylinder, a jack screw disposed within said tube, means for connecting said jack screw to the valve to be tested, means associated with the plunger for causing the jack screw to press upon the plunger construction to unseat the valve, said means serving simultaneously to cause the plunger construction to exert a pressure upon the liquid, and pressure indicating means for indicating the pressure developed upon the liquid.

4. A safety valve tester comprising a cylinder, a liquid in the cylinder, a plunger construction in the cylinder, a jack screw bearing upon the plunger construction adapted to be connected to a valve to be tested and adapted to unseat the same, and a pressure gauge for indicating the pressure developed in the cylinder on unseating the valve.

5. A safety valve tester comprising a cylinder, a fluid in the cylinder, a jack screw engageable with a valve to be tested and adapted to unseat the same, a plunger construction in the cylinder, said jack screw being engageable with said plunger construction whereby said plunger construction may develop pressure in the cylinder on unseating the valve and pressure indicating means for indicating the pressure developed in the cylinder thereby.

6. A safety valve tester comprising an annular base, supporting legs thereon, a cylinder supported upon the supporting legs, a plunger in the cylinder, a liquid in the cylinder against which the plunger bears, a tube fastened to the plunger and slidably extending through the bottom of the cylinder, a jack screw disposed within said tube, a collar threaded onto the upper end of the jack screw and bearing against the plunger, means for connecting the jack screw to a valve to be tested, and a pressure gauge for indicating the pressure developed upon the liquid within the cylinder.

7. A device for testing safety valves for tank cars comprising a jack screw construction adapted for connection to a safety valve and bearing upon a plunger construction, and means for indicating the pressure exerted upon a liquid by said plunger construction.

In testimony whereof I have signed my name to this specification.

WILLIAM H. FINE.